(12) United States Patent
Liu et al.

(10) Patent No.: US 7,858,699 B2
(45) Date of Patent: Dec. 28, 2010

(54) THERMALLY REVERSIBLE COMPOSITE MATERIAL

(75) Inventors: Ying-Ling Liu, Tao-Yuan (TW); Meng-Han Fanchiang, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 372 days.

(21) Appl. No.: 11/958,488

(22) Filed: Dec. 18, 2007

(65) Prior Publication Data

US 2009/0156754 A1 Jun. 18, 2009

(51) Int. Cl.
  *C08G 77/00* (2006.01)
  *C08G 77/20* (2006.01)
  *C08L 83/10* (2006.01)
  *C08F 283/12* (2006.01)

(52) U.S. Cl. .......................... 525/10; 525/431; 525/479; 525/451; 525/471

(58) Field of Classification Search .................... 528/10; 525/431, 479, 451, 471
See application file for complete search history.

(56) References Cited

U.S. PATENT DOCUMENTS 7,345,125 B2 * 3/2008 Isozaki et al. ............... 526/279
2004/0198855 A1 * 10/2004 Adegawa .................... 521/154
2006/0194068 A1 * 8/2006 Katoh et al. ................ 428/447
2008/0020213 A1 * 1/2008 Lichtenhan et al. ......... 428/447

OTHER PUBLICATIONS

Bent et al. "Cyclopentadienyl-functionalised polyhedral silsesquioxanes as building blocks for new nanostructured materials", Journal of Organometallic Chemistry, 690, 2005, pp. 463-468.*

* cited by examiner

*Primary Examiner*—Randy Gulakowski
*Assistant Examiner*—Robert Loewe
(74) *Attorney, Agent, or Firm*—WPAT, PC; Justin King

(57) ABSTRACT

The present invention discloses a thermally reversible composite material. The thermally reversible composite material comprises a Polyhedral Oligomeric Silsesquioxane (POSS) and a cross-linking agent. The Polyhedral Oligomeric Silsesquioxane comprises a plurality of dienophile groups. The cross-linking agent comprises at least two conjugated diene groups. The cross-linking agent interacts with the plurality of dienophile groups of the POSS though the conjugated diene groups to perform a thermally reversible Diels-Alder cycloaddition cross-linking reaction. The invention is applied as thermally reversible package materials.

22 Claims, 2 Drawing Sheets

THERMALLY REVERSIBLE COMPOSITE MATERIAL

BACKGROUND OF THE INVENTION

1. Field of the Invention

The present invention is related to a composite material and, particularly to a thermally reversible composite material.

2. Description of the Prior Art

The Diels-Alder reaction, also called the "[4+2]cycloaddition reaction," was proposed in 1928 by German chemists, Otto Diels and Kurt Alder, who found that by adding an electron-withdrawing group of an alkyne or alken to a conjugated diene, a cyclohexene can be formed. According to many researches, the Diels-Alder reaction is a thermally reversible reaction, and a diene and dienophile are mainly used to carry out the cycloaddition reaction. At high temperatures, the Diels-Alder reaction tends to occur in the reverse direction. It is so called the "Retro-Diels-Alder reaction." When the Retro-Diels-Alder reaction happens, a catalytic agent is not necessary. Only high temperature is required for the Retro-Diels-Alder reaction to take place. For instance, furan and maleic anhydride can react with each other to combine the dienes thereof and form a cycloaddition polymer. However, such polymer will decompose into a diene and a dienophile at a temperature which is equal to or higher than its melting point.

Package materials usually are formed from thermosetting cross-link polymers. However, after the cross-link polymers are cured, the packaging can not be undone or patched in case of flaws. That results in high manufacturing costs. Since the requirements of environmental protection are getting higher and higher, the green (or environment-friendly) package is the trend for the market development. Therefore, it is important for the industries to develop a package material for package rework or repair.

SUMMARY OF THE INVENTION

According to the above-mentioned background of the present invention, to fulfill the industrial requirements, the present invention provides a thermally reversible composite material.

One of the purposes of the present invention is to provide a thermally reversible composite material that comprises a Polyhedral Oligomeric Silsesquioxane (POSS) and a cross-linking agent. The above-mentioned Polyhedral Oligomeric Silsesquioxane has high density, high thermal stability, low dielectric constant, radiation stability, and is anti-oxygen. The Polyhedral Oligomeric Silsesquioxane also increases its toughness and reduces its flammability. Thus, the present invention will apply the Polyhedral Oligomeric Silsesquioxane to cross-linking reactions to enhance the application efficiency and scope of the cross-link polymers.

One of the purposes of the present invention is to use the above-mentioned Polyhedral Oligomeric Silsesquioxane, which comprises a dienophile group, and the above-mentioned cross-linking agent, which comprises a diene group, where the above-mentioned dienophile group and diene group can be used to carry out a thermally reversible Diels-Alder cycloaddition cross-linking reaction.

One of the purposes of the present invention is to provide a thermally reversible package material, which has thermal reversibility. When packaging is not perfect, the packaging can be undone or patched by controlling the reaction temperature. Thus, the utility value of the package materials can be increases while the manufacturing costs can be reduced.

According to the above-mentioned purposes, the present invention discloses a thermally reversible composite material, which can be used as a thermally reversible package material.

BRIEF DESCRIPTION OF THE DRAWINGS

FIG. 3A shows the situation where the polymers, generated by the thermally reversible Diels-Alder cycloaddition cross-linking reaction disclosed in the example 1, do not dissolve in the solvent, 1-Methyl-2-Pyrrolidinone, at the room temperature, while

DESCRIPTION OF THE PREFERRED EMBODIMENTS

Figure 1:
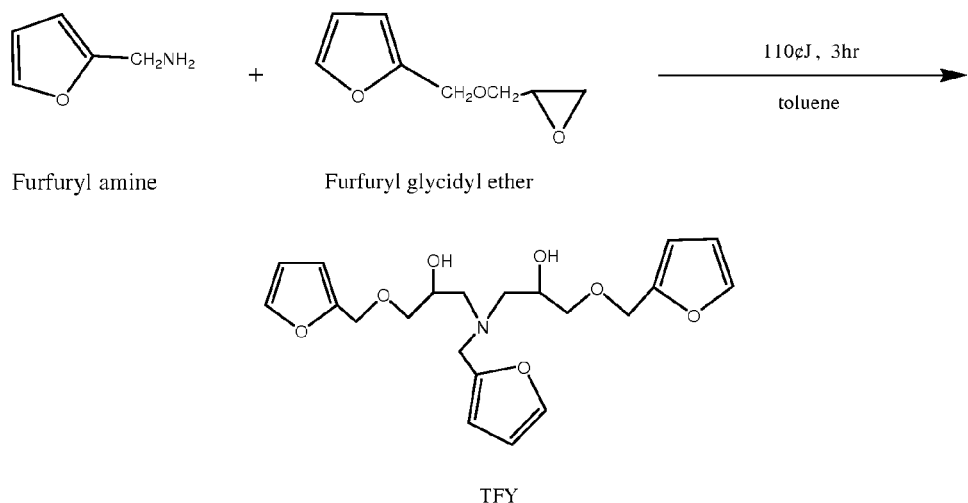
FIG. 1 shows the structural formulas of the reaction concerning the preparation of TFY, disclosed in the example 1 of the present invention.

The present invention discusses a thermally reversible composite material. To make the readers understand the invention thoroughly, the detailed description is provided as follows. Obviously, the embodiments of the present invention are not limited to the details known to the ordinary skilled in the art. And the well-known compositions or steps are not described in the details in order not to cause unnecessary limitations. The preferred embodiments of the present invention will be described as follows. Besides, these detailed descriptions, the present invention can be used for other embodiments, and the scope of the present invention is not limited to but is defined in appended claims.

The first embodiment of the present invention discloses a thermally reversible composite material. The material comprises a Polyhedral Oligomeric Silsesquioxane (POSS) and a cross-linking agent. The Polyhedral Oligomeric Silsesquioxane comprises a plurality of dienophile groups, and the cross-linking agent comprises at least two conjugated diene groups. By using the dienophile groups and the conjugated diene groups, a thermally reversible Diels-Alder cycloaddition cross-linking reaction can be carried out. If the dienophile groups and the conjugated diene groups have electron-withdrawing substituents, it would be more advantageous to carry out the Diels-Alder cycloaddition cross-linking reaction. Additionally, the number of the silicon atoms in the above-mentioned Polyhedral Oligomeric Silsesquioxane is one selected from four to sixteen, and the preferred number is one selected from six to sixteen.

In one of the exemplifications of this embodiment, the reaction temperature of the above-mentioned thermally reversible Diels-Alder cycloaddition cross-linking reaction is one selected from 50° C. to 170° C. And the temperature of the Retro Diels-Alder reaction is equal to or higher than 130° C. Therefore, the composite material of the present invention is very suitable to the applications of thermally reversible package materials.

The above-mentioned plurality of dienophile groups can be identical or different, and be selected from the group consisting of the following or any combination thereof, where X is a nitrogen atom or an oxygen atom:

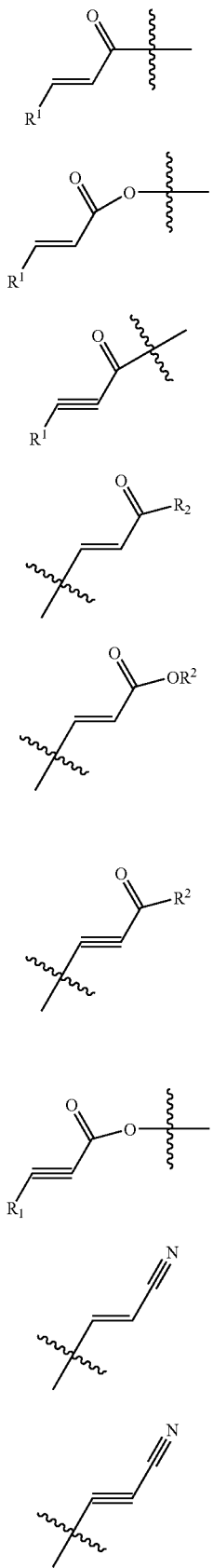
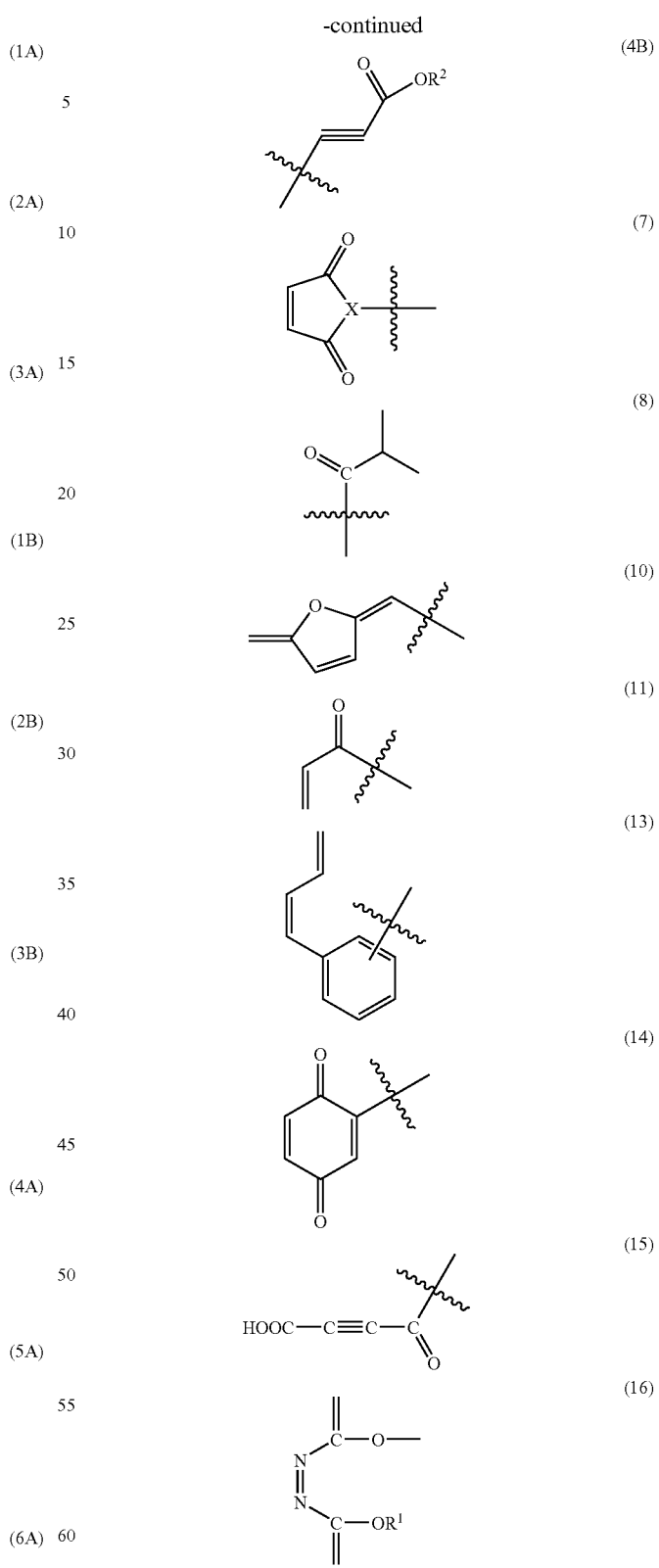
and $R^1$ and $R^2$ may be identical or different, where they are selected from the group consisting of the following or any combination thereof: hydrogen atom, alkyl, aralkyl, oxyalkyl, and oxyaralkyl. The number of the carbon atoms in $R^1$ or $R^2$ is one selected from one to twenty. The above-mentioned conjugated diene may be one selected from the group consisting of the following or any combination thereof: diene, pyrane, furan, thiophene, pyrrole, and the derivatives thereof.

The second embodiment of the present invention discloses a thermally reversible composite material. The composite material comprises a Polyhedral Oligomeric Silsesquioxane (POSS) and a cross-linking agent. The Polyhedral Oligomeric Silsesquioxane comprises a plurality of dienophile groups, and the cross-linking agent comprises at least two conjugated diene groups. A thermally reversible Diels-Alder cycloaddition cross-linking reaction is carried out at the first temperature by the dienophile groups and the conjugated diene groups. Besides, at the second temperature, which is higher than the first temperature, a Retro Diels-Alder reaction will be carried out. Lastly, an irreversible thermosetting cross-linking reaction is carried out only by the dienophile groups. If the dienophile groups and the conjugated diene groups have electron-withdrawing substituents, it would be more advantageous to carry out the Diels-Alder cycloaddition cross-linking reaction. Additionally, the number of the silicon atoms in the above-mentioned Polyhedral Oligomeric Silsesquioxane is one selected from four to sixteen, and the preferred number is selected from six to sixteen.

In one of the preferred exemplifications of the second embodiment, the first temperature is one selected from 50° C. to 170° C. The second temperature is one selected from about 130° C. to about 210° C. And the third temperature is equal to or higher than 220° C. Accordingly, the composite materials of the invention are very suitable to the applications of thermally reversible package materials.

The above-mentioned plurality of dienophile groups may be identical or different, and may be selected from the group consisting of the following or any combination thereof, where X is a nitrogen atom or an oxygen atom:

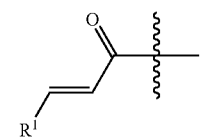
(1A)

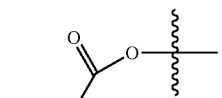
(2A)

(3A)

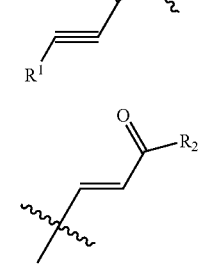
(1B)

-continued

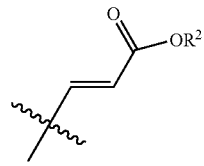
(2B)

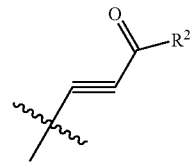
(3B)

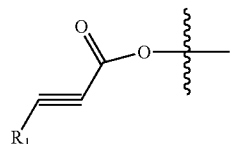
(4A)

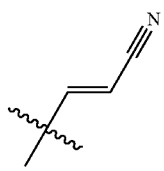
(5A)

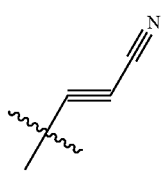
(6A)

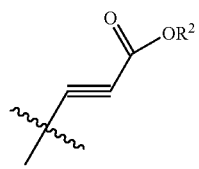
(4B)

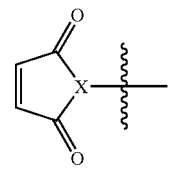
(7)

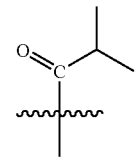
(8)

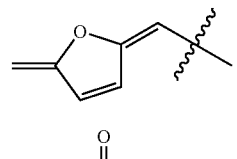
(10)

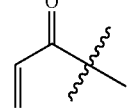
(11)

-continued

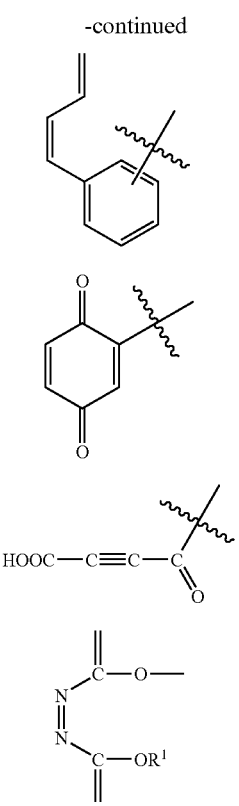

and R¹ and R² may be identical or different, where they are selected from the group consisting of the following or any combination thereof: hydrogen atom, alkyl, aralkyl, oxyalkyl, and oxyaralkyl. The number of the carbon atoms in R¹ and R² is one selected from one to twenty.

The above-mentioned conjugated dienes may be diene, pyrane, furan, thiophene, pyrrole and the derivatives thereof.

EXAMPLE 1

Thermally Reversible Diels-Alder Cycloaddition Cross-Linking Reaction of TFY and Methacryl POSS (1) Preparation and Purification of TFY Add furfuryl amine (0.93 g, 0.00957 mole) and agent-grade 96% furfuryl glycidyl ether (3.07 g, 0.0199 mole) into a 100 ml round bottom flask. Add toluene (50 ml) as a solvent into the round bottom flask. Then, use an aluminum foil to cover the round bottom flask to prevent from being exposed to sun light. Put the round bottom flask into an oil bath for three hours disturbance at 110° C. After that, use a vacuum condenser to extract the solvent. Use an n-hexane solution to rinse the residues two or three times. Lastly, put the residues in a vacuum dryer for forty eight hours at the room temperature until the residues become dark amber color cream liquid. The yield rate is 21%. The products are a monomer having three furan functional groups, called "TFY." FIG. 1 shows the structural formulas of the reaction.

Figure 2:
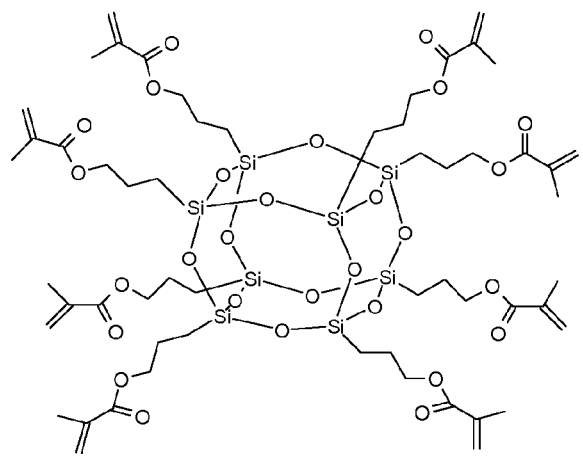
FIG. 2 is the structural formula of Methacryl POSS, disclosed in the example 1 of the present invention.
Figure 3A:
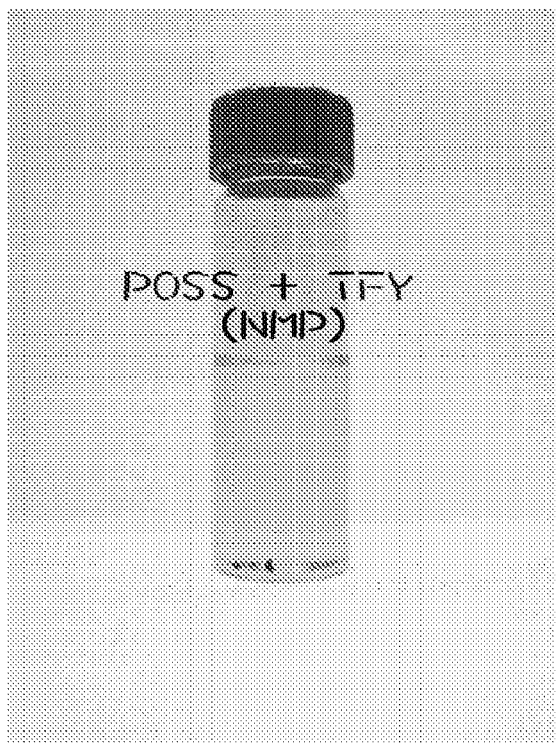
Figure 3B:
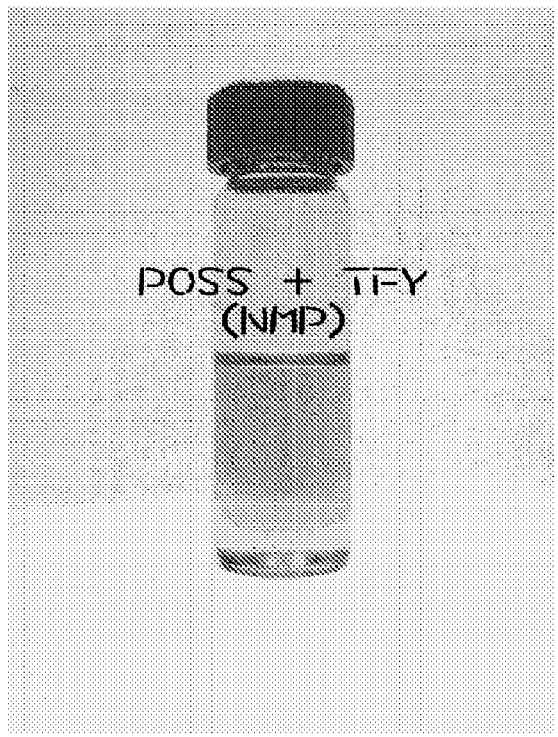
FIG. 3B shows the situation where the polymers dissolve by the thermally reversible reaction at 180° C.

(2) Thermally Reversible Diels-Alder Cycloaddition Cross-Linking Reaction of TFY and Methacryl POSS The Diels-Alder cycloaddition cross-linking reaction is operated by TFY, which has furan functional groups, and C=C chains, which belong to Methacryl POSS structure (shown in FIG. 2). Put TFY (1.28 g, 0.316 mole) and Methacryl POSS (1.70 g, 1.19×10⁻³ mole) into a 50 ml round bottom flask. Add some dimethyl acetamide (DMAc) as a solvent into the round bottom flask. Disturb the solution at 150° C. for thirty six hours. Observe the change of viscosity. Lastly, use water to have the products deposit. Then, the brown color polymers, made from the Diels-Alder cycloaddition cross-linking reaction, are found. Put these Diels-Alder cycloaddition cross-linking polymers into an 1-Methyl-2-Pyrrolidinone (NMP) solution, as shown in FIG. 3A, at the room temperature. Then, heat these Diels-Alder cycloaddition cross-linking polymers at 180° C. for one hour to let these previously insoluble polymers dissolve through the Retro Diels-Alder reaction. Additionally, heat these Diels-Alder cycloaddition cross-linking polymers at 220° C. for thirty six hours to get new polymers. Put these new polymers into the 1-Methyl-2-Pyrrolidinone solution, and heat the solution at 180° C. for 4.5 hours. These new polymers become slightly soluble not as these Diels-Alder cycloaddition cross-linking polymers become completely soluble. The reason is that the C=C chains of Methacryl POSS cross-linked with one another as that the above-mentioned new polymers cannot be completely soluble. Thus, these new polymers are a thermally irreversible polymer.

Apparently, according to the descriptions of the above-mentioned embodiments, the present invention may have many corrections and differences. Thus, it is necessary to consult with the appended claims and the scope thereof to understand the present invention. Besides, the above-mentioned detailed descriptions, the present invention can be applied extensively to other embodiments. The above-mentioned descriptions are only the preferred embodiments of the present invention. They are not used to limit the scope of the claims of the present invention. Other equivalents or modifications within the scope the present invention or the concepts disclosed by the present invention should be encompassed by the following claims.

What is claimed is:

1. A thermally reversible composite material, comprising:
   a Polyhedral Oligomeric Silsesquioxane (POSS), comprising a plurality of dienophile groups; and
   a cross-linking agent, comprising at least two conjugated diene groups, wherein the cross-linking agent reacts with the plurality of dienophile groups of the POSS through the conjugated diene groups to carry out a thermally reversible Diels-Alder cycloaddition cross-linking reaction, wherein the plurality of dienophile groups of the Polyhedral Oligomeric Silsesquioxane are identical or different, independently selected from the group consisting of the following or any combination thereof, where X is a nitrogen atom or an oxygen atom:

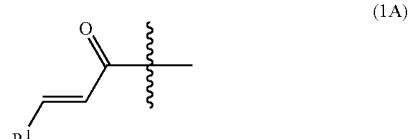

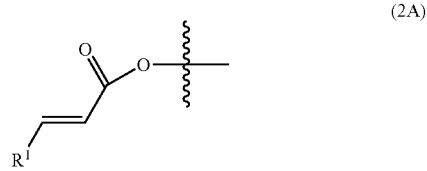

and $R^1$ and $R^2$ are identical or different, independently selected from the group consisting of the following or any combination thereof: hydrogen atom, alkyl, aralkyl, oxyalkyl, and oxyaralkyl, wherein the number of the carbon atoms of $R^1$ or $R^2$ is one selected from one to twenty.

2. The thermally reversible composite material claimed in the claim 1, wherein the number of the silicon atoms in the Polyhedral Oligomeric Silsesquioxane is one selected from four to sixteen.

3. The thermally reversible composite material claimed in the claim 1, wherein the number of the silicon atoms in the Polyhedral Oligomeric Silsesquioxane is one selected from six to sixteen.

4. The thermally reversible composite material claimed in the claim 1, wherein the conjugated diene groups are selected from the group consisting of the following, or any combination thereof: diene, pyrane, furan, thiophene, pyrrole and the derivatives thereof.

5. The thermally reversible composite material claimed in the claim 1, wherein the structural formula of the cross-linking agent is as follows:

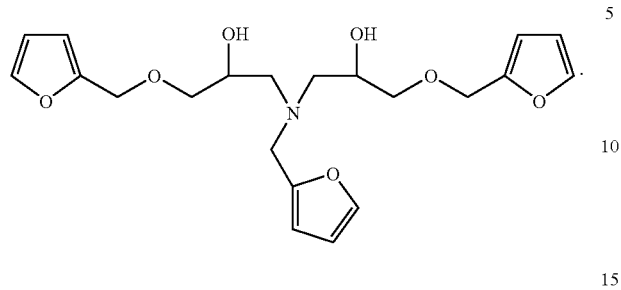

6. The thermally reversible composite material claimed in the claim 1, wherein the thermally reversible composite material is utilized as a thermally reversible package material.

7. A composite material, comprising:
a Polyhedral Oligomeric Silsesquioxane (POSS), comprising a plurality of dienophile groups; and
a cross-linking agent, comprising at least two conjugated diene groups, the cross-linking agent interacting with the plurality of dienophile groups of the POSS through the conjugated diene groups to perform a thermally reversible Diels-Alder cycloaddition cross-linking reaction at a first temperature and a Retro Diels-Alder reaction at a second temperature, the plurality of dienophile groups of the POSS reacting with one another to perform a thermally irreversible thermosetting cross-linking reaction at a third temperature, the first temperature being lower than the second temperature, the second temperature being lower than the third temperature,
wherein the plurality of dienophile groups of the Polyhedral Oligomeric Silsesquioxane are identical or different, independently selected from one of the group consisting of the following or any combination thereof, where X is a nitrogen atom or an oxygen atom:

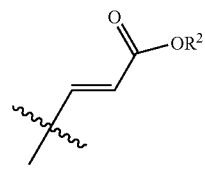 (1A)

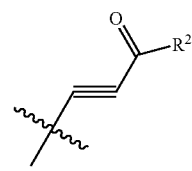 (2A)

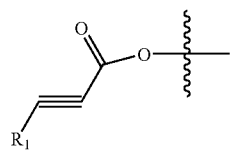 (3A)

(1B)

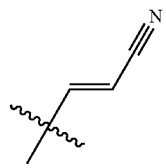 (2B)

(3B)

(4A)

(5A)

(6A)

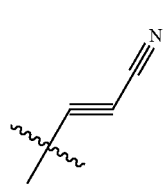 (4B)

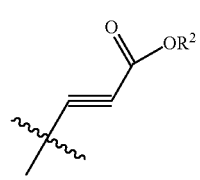 (7)

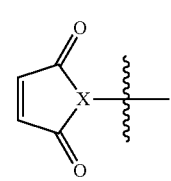 (8)

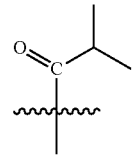

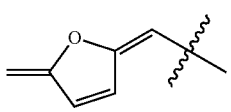 (10)

-continued

(11) 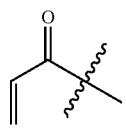

(13) 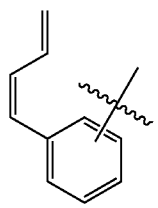

(14) 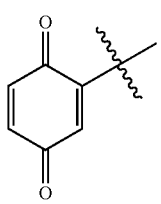

(15) 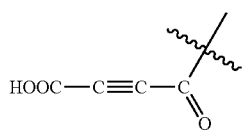

(16) 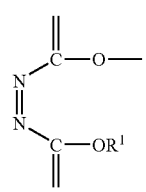

and $R^1$ and $R^2$ are identical or different, independently selected from the group consisting of the following or any combination thereof: hydrogen atom, alkyl, aralkyl, oxyalkyl, and oxyaralkyl, wherein the number of the carbon atoms of $R^1$ or $R^2$ is one selected from one to twenty.

8. The composite material claimed in the claim 7 wherein the number of the silicon atoms of the Polyhedral Oligomeric Silsesquioxane is one selected from four to sixteen.

9. The composite material claimed in the claim 7, wherein the number of the silicon atoms of the Polyhedral Oligomeric Silsesquioxane is one selected from six to sixteen.

10. The composite material claimed in the claim 7, wherein the conjugated diene groups are selected from the group consisting of the following, or any combination thereof: diene, pyrane, furan, thiophene, pyrrole and the derivatives thereof.

11. The composite material claimed in the claim 7, wherein the structural formula of the cross-linking agent is as follows:

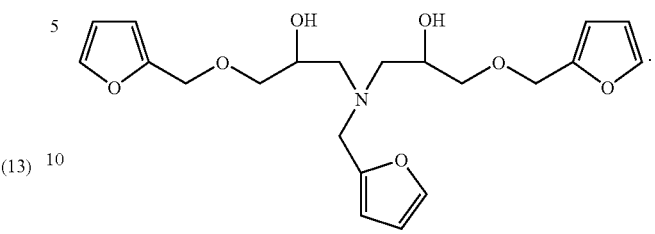

12. The composite material claimed in the claim 7, wherein the thermally reversible composite material is utilized as a thermally reversible package material.

13. A thermally reversible composite material, comprising:
a Polyhedral Oligomeric Silsesquioxane (POSS), comprising a plurality of dienophile groups, wherein the Polyhedral Oligomeric Silsesquioxane is Methacryl- POSS; and
a cross-linking agent, comprising at least two conjugated diene groups, wherein the cross-linking agent reacts with the plurality of dienophile groups of the POSS through the conjugated diene groups to carry out a thermally reversible Diels-Alder cycloaddition cross-linking reaction.

14. The thermally reversible composite material claimed in the claim 13, wherein the number of the silicon atoms in the Polyhedral Oligomeric Silsesquioxane is one selected from four to sixteen.

15. The thermally reversible composite material claimed in the claim 13, wherein the conjugated diene groups are selected from the group consisting of the following, or any combination thereof: diene, pyrane, furan, thiophene, pyrrole and the derivatives thereof.

16. The thermally reversible composite material claimed in the claim 13, wherein the structural formula of the cross-linking agent is as follows:

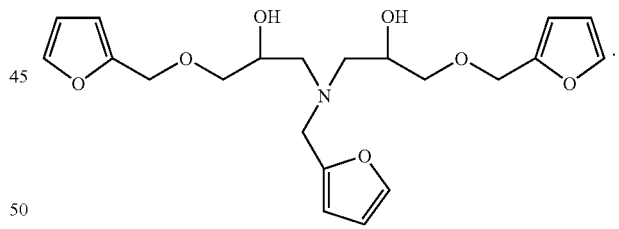

17. The thermally reversible composite material claimed in the claim 13, wherein the thermally reversible composite material is utilized as a thermally reversible package material.

18. A composite material, comprising:
a Polyhedral Oligomeric Silsesquioxane (POSS), comprising a plurality of dienophile groups, wherein the Polyhedral Oligomeric Silsesquioxane is Methacryl- POSS; and
a cross-linking agent, comprising at least two conjugated diene groups, the cross-linking agent interacting with the plurality of dienophile groups of the POSS through the conjugated diene groups to perform a thermally reversible Diels-Alder cycloaddition cross-linking reaction at a first temperature and a Retro Diels-Alder reaction at a second temperature, the plurality of dienophile groups of the POSS reacting with one another to perform a thermally irreversible thermosetting cross-linking reaction at a third temperature, the first temperature being lower than the second temperature, the second temperature being lower than the third temperature.

19. The composite material claimed in the claim 18, wherein the number of the silicon atoms of the Polyhedral Oligomeric Silsesquioxane is one selected from four to sixteen.

20. The composite material claimed in the claim 18, wherein the conjugated diene groups are selected from the group consisting of the following, or any combination thereof: diene, pyrane, furan, thiophene, pyrrole and the derivatives thereof.

21. The composite material claimed in the claim 18, wherein the structural formula of the cross-linking agent is as follows:

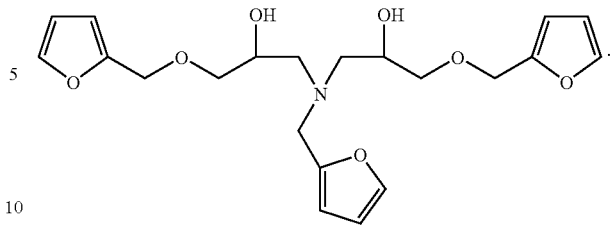

22. The composite material claimed in the claim 18, wherein the thermally reversible composite material is utilized as a thermally reversible package material.

* * * * *